(12) United States Patent
Waters et al.

(10) Patent No.: US 8,991,250 B2
(45) Date of Patent: Mar. 31, 2015

(54) TUNING FORK GYROSCOPE TIME DOMAIN INERTIAL SENSOR

(75) Inventors: Richard L. Waters, San Diego, CA (US); Paul David Swanson, Santee, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 337 days.

(21) Appl. No.: 13/610,618

(22) Filed: Sep. 11, 2012

(65) Prior Publication Data

US 2014/0069188 A1  Mar. 13, 2014

(51) Int. Cl.
  *G01C 19/56*  (2012.01)
  *G01C 19/5621*  (2012.01)
  *G01C 19/5607*  (2012.01)

(52) U.S. Cl.
  CPC ........ G01C 19/5621 (2013.01); G01C 19/5607 (2013.01)
  USPC ...................................................... 73/504.16

(58) Field of Classification Search
  USPC .............. 73/504.16, 504.12, 504.04; 310/370
  See application file for complete search history.

(56) References Cited

U.S. PATENT DOCUMENTS

| | | | |
|---|---|---|---|
| 5,023,503 A | | 6/1991 | Legge et al. |
| 5,729,075 A | * | 3/1998 | Strain ........................... 310/309 |
| 6,289,733 B1 | | 9/2001 | Challoner et al. |
| 6,439,052 B1 | * | 8/2002 | Abe et al. ................... 73/504.16 |
| 6,474,162 B1 | * | 11/2002 | Voss et al. .................. 73/504.16 |
| 6,497,148 B1 | * | 12/2002 | Abe et al. ................... 73/504.16 |
| 6,674,141 B1 | | 1/2004 | Kubena et al. |
| 6,838,806 B2 | | 1/2005 | Chua et al. |
| 7,051,592 B2 | * | 5/2006 | Fujimoto et al. ........... 73/504.16 |
| 7,093,487 B2 | | 8/2006 | Mochida |
| 7,188,525 B2 | * | 3/2007 | Machida et al. ........... 73/504.16 |
| 7,284,429 B2 | | 10/2007 | Chaumet et al. |
| 7,360,422 B2 | * | 4/2008 | Madni et al. ................ 73/504.16 |
| 7,456,555 B2 | * | 11/2008 | Matsudo et al. .............. 310/370 |
| 7,832,271 B2 | | 11/2010 | Mita et al. |
| 8,347,719 B2 | * | 1/2013 | Ichikawa .................... 73/504.16 |
| 8,427,249 B1 | * | 4/2013 | Swanson et al. .............. 331/154 |
| 8,490,462 B2 | * | 7/2013 | Swanson et al. ............... 73/1.38 |

(Continued)

OTHER PUBLICATIONS

Unpublished U.S. Appl. No. 13/168,603, filed Jun. 24, 2011, Titled "Apparatus and Methods for Time Domain Measurement of Oscillation Perturbations," by Paul D. Swanson et al.

(Continued)

*Primary Examiner* — Helen Kwok
(74) *Attorney, Agent, or Firm* — SPAWAR Systems Center Pacific; Kyle Eppele; J. Eric Anderson

(57) ABSTRACT

A gyroscope comprising: a frame; a tuning fork comprising a base and first and second prongs, wherein the base has proximal and distal ends, and wherein the proximal end is coupled to the frame and the distal end is coupled to the first and second prongs; first and second drivers configured to drive the first and second prongs respectively to oscillate with respect to the frame in a first direction, such that the prongs oscillate at their respective resonant frequencies and 180° out of phase with each other; and at least two digital position triggers operatively coupled to the frame and to the tuning fork, wherein each position trigger is configured to experience at least two trigger events during each oscillation of the tuning fork in a second direction, wherein the second direction is orthogonal to the first direction.

19 Claims, 17 Drawing Sheets

(56) References Cited

U.S. PATENT DOCUMENTS

| | | | |
|---|---|---|---|
| 8,650,955 B2* | 2/2014 | Swanson et al. | 73/504.12 |
| 2001/0008089 A1* | 7/2001 | Abe et al. | 73/504.16 |
| 2004/0217388 A1 | 11/2004 | Kubena et al. | |
| 2010/0116630 A1 | 5/2010 | Pinkerton | |

OTHER PUBLICATIONS

Unpublished U.S. Appl. No. 13/276,948, filed Oct. 19, 2011, Titled "Resonator with Reduced Acceleration Sensitivity and Phase Noise Using Time Domain Switch," by Paul D. Swanson et al.

Unpublished U.S. Appl. No. 13/282,062, filed Oct. 26, 2011, Titled "Auto-Ranging for Time Domain Inertial Sensor," by Paul D. Swanson et al.

Unpublished U.S. Appl. No. 13/288,841, filed Nov. 3, 2011, Titled "Oscillation Apparatus with Atomic-Layer Proximity Switch," by Andrew Wang et al.

Unpublished U.S. Appl. No. 13/353,205, filed Jan. 18, 2012, Titled "Time Domain Switched Gyroscope," by Paul D. Swanson et al.

Steward, Victoria; Modeling of a folded spring supporting MEMS gyroscope; Masters thesis; Massachusetts; Jun. 20, 2003.

Unpublished U.S. Appl. No. 13/425,631, filed Mar. 21, 2012, Titled "In-Plane, Six Degree of Freedom Inertial Device with Integrated Clock," by Paul D. Swanson et al.

* cited by examiner

TUNING FORK GYROSCOPE TIME DOMAIN INERTIAL SENSOR

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 7274, San Diego, Calif., 92152; voice (619) 553-572; ssc_pac_t2@navy.mil. Reference Navy Case Number 101330.

BACKGROUND OF THE INVENTION

The invention disclosed herein relates to the field of gyroscopic inertial sensing. Highly stable and accurate microelectrical-mechanical system (MEMS) gyroscopes are needed for navigational inertial sensing. Larger gyroscopes can meet the accuracy requirements needed for inertial navigation, but are expensive and require more space than a MEMS gyroscope. Current MEMS gyroscopes are subject to electronic and mechanical noise, non-linearity, and drift in mechanical parameters which cause error to their measurements. Conventional MEMS tuning fork gyroscopes use capacitance to measure the offset caused by the Coriolis force. A need exists for a more accurate and more stable tuning fork gyroscope.

SUMMARY

Disclosed herein is an inertial-sensing-capable tuning fork gyroscope comprising a frame, a tuning fork, and at least two digital position triggers. The tuning fork comprises a base and first and second prongs. The base has proximal and distal ends. The proximal end is coupled to the frame and the distal end is coupled to the first and second prongs. The first and second prongs are driven by first and second drivers respectively to oscillate with respect to the frame in a first direction, such that the prongs oscillate at their respective resonant frequencies and 180° out of phase with each other. The digital position triggers are operatively coupled to the frame and to the tuning fork. Each position trigger is configured to experience at least two trigger events during each oscillation of the tuning fork in a second direction. The second direction is orthogonal to the first direction.

The tuning fork gyroscope disclosed herein may be used for inertial sensing according to the method. The first step provides for driving first and second prongs of the tuning fork gyroscope to oscillate with respect to a frame of the tuning fork gyroscope in a first direction, such that the prongs oscillate at their respective resonant frequencies and 180° out of phase with each other. The second step provides for monitoring closed and open states of two pairs of second-direction-stacked electron-tunneling-tip switches, wherein the second direction is orthogonal to the first direction, and wherein each pair of switches is operatively coupled to the frame and the tuning fork such that each pair of switches passes through at least two closed states during each oscillation of the tuning fork in the second direction. The third step provides for measuring the time interval between closed states of each switch pair to characterize the offset of the tuning fork in the second direction. The fourth step provides for determining the Coriolis forces acting on the tuning fork gyroscope by calculating the offset of the tuning fork in the second direction.

An alternative embodiment of the tuning fork gyroscope comprises a frame, a tuning fork, first and second drivers, and first and second pairs of electron-tunneling tip switches. The tuning fork comprises a base and first and second prongs, wherein a proximal end of the base is coupled to the frame and wherein proximal ends of the first and second prongs are coupled to a distal end of the base. The first driver is operatively coupled to the first prong such that the first driver is configured to drive the first prong to oscillate with respect to the frame in a first direction at the first prong's resonant frequency. The second driver is operatively coupled to the second prong such that the second driver is configured to drive the second prong to oscillate with respect to the frame in the first direction at the second prong's resonant frequency and 180° out of phase with the first prong. The first pair of electron-tunneling tip switches is operatively coupled to the frame and a first location on the tuning fork such that the first pair of switches is configured to switch from an open state to a closed state at least twice during a complete oscillation of the tuning fork with respect to the frame in the second direction. The second pair of electron-tunneling tip switches is operatively coupled to the frame and to a second location on the tuning fork such that the second pair of switches is configured to switch from an open state to a closed state at least twice during a complete oscillation of the tuning fork with respect to the frame in the second direction.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1:
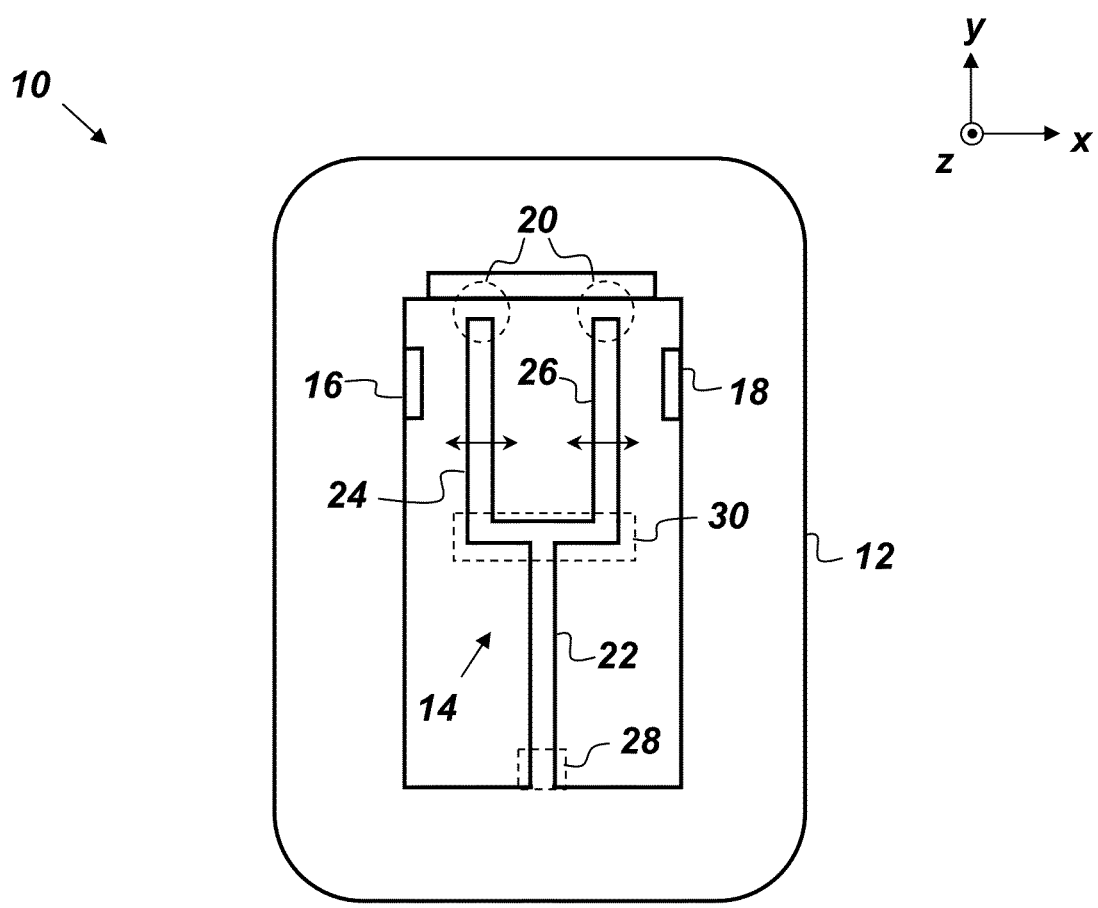
FIG. 1 is a top view illustration of an embodiment of a tuning fork gyroscope.

FIG. 1 is a top view illustration of a tuning fork gyroscope 10 capable of time-domain inertial sensing. The gyroscope 10 comprises a frame 12, a tuning fork 14, first and second drivers 16 and 18 respectively, and at least two digital position triggers 20. The tuning fork 14 comprises a base 22 and first and second prongs 24 and 26 respectively. The base 22 has a proximal end 28 and a distal end 30. The base's proximal end 28 is coupled to the frame 12 and the distal end 30 is coupled to the first and second prongs 24 and 26. The first and second drivers 16 and 18 are configured to drive the first and second prongs 24 and 26 respectively to oscillate with respect to the frame 12 in a first direction such that the prongs 24 and 26 oscillate at their respective resonant frequencies and 180° out of phase with each other. In FIG. 1, the first direction corresponds to the x-direction. However, it is to be understood that the first and second prongs 24 and 26 may be driven to oscillate in any desired direction and the x-direction is only offered as one example. The digital position triggers 20 are operatively coupled to the frame 12 and to the tuning fork 14. Each position trigger 20 is configured to experience at least two trigger events during each oscillation of the tuning fork 14 in a second direction, which is orthogonal to the first direction. In FIG. 1, the second direction corresponds to the z-direction.

The gyroscope 10 may be manufactured on any scale. For example, in one embodiment the gyroscope 10 may be monolithically integrated into a micro-electro-mechanical system (MEMS) device. The gyroscope 10 may be used in any orientation. Although the x-y-z coordinate system is depicted in the drawings and referred to herein, it is to be understood that the first, second, and third directions/axes, as used herein, may correspond to any three mutually-orthogonal directions/axes in any three-dimensional coordinate system.

The frame 12 may be any size and shape, and be made of any material capable of providing rigid support for the gyroscope 10 such that the frame 12 does not significantly flex and/or deform when exposed to lateral and rotational accelerations of the gyroscope 10.

The first and second drivers 16 and 18 may each be any apparatus capable of causing the first and second prongs 24 and 26 to oscillate at any desired frequency in the x-direction with respect to the frame 12. Suitable examples of the first and second drivers 16 and 18 include, but are not limited to, variable area actuators, such as electrostatic comb drives (such as are portrayed in FIG. 2B), variable gap actuators, such as parallel plate actuators, and other electro-magnetic or piezoelectric mechanisms of actuation. Each of the first and second prongs 24 and 26 may be driven using a continuous oscillating force or by periodic "delta function" forces in phase with the given prong's harmonic resonance.

The digital trigger 20 may be any apparatus capable of producing digital signals corresponding to various positions of a section of the tuning fork (i.e., the section to which the given digital trigger 20 is attached) with respect to the frame 12. For example, the digital trigger 20 may be any device capable of experiencing a change in state based on positional changes of the tuning fork 14 relative to the frame 12. Other examples of the digital trigger 20 include an electron tunneling switch, a capacitive switch, an optical shutter switch, and a magnetic switch. A purpose of the digital trigger 20 is to localize the position of the section to which the given digital trigger 20 is attached and the frame 12 such that an accurate acceleration-independent phase measurement can be performed—thereby increasing stability of a phased-locked loop closure and reducing overall phase noise and jitter of the gyroscope 10.

Figure 2A:
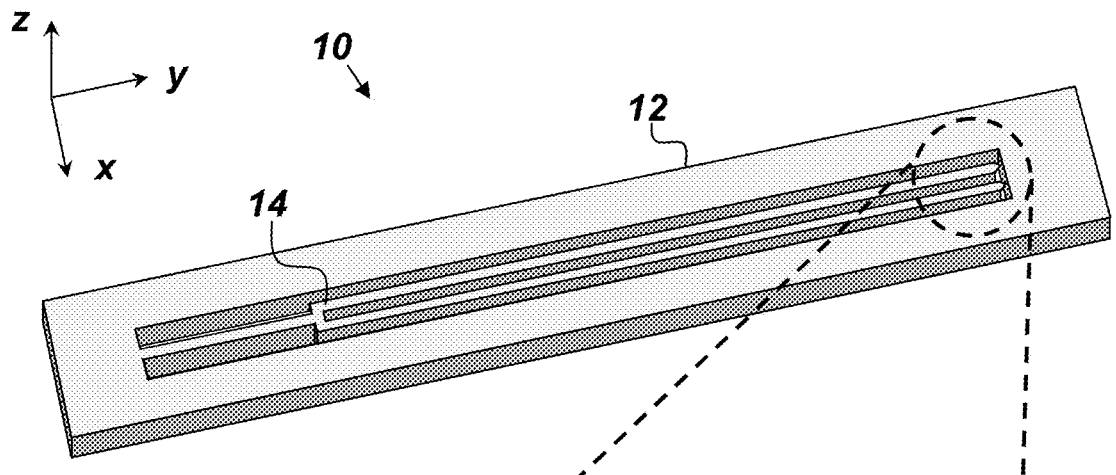
FIGS. 2A-2B represent a perspective view of an example MEMS embodiment of a tuning fork gyroscope.
Figure 2B:
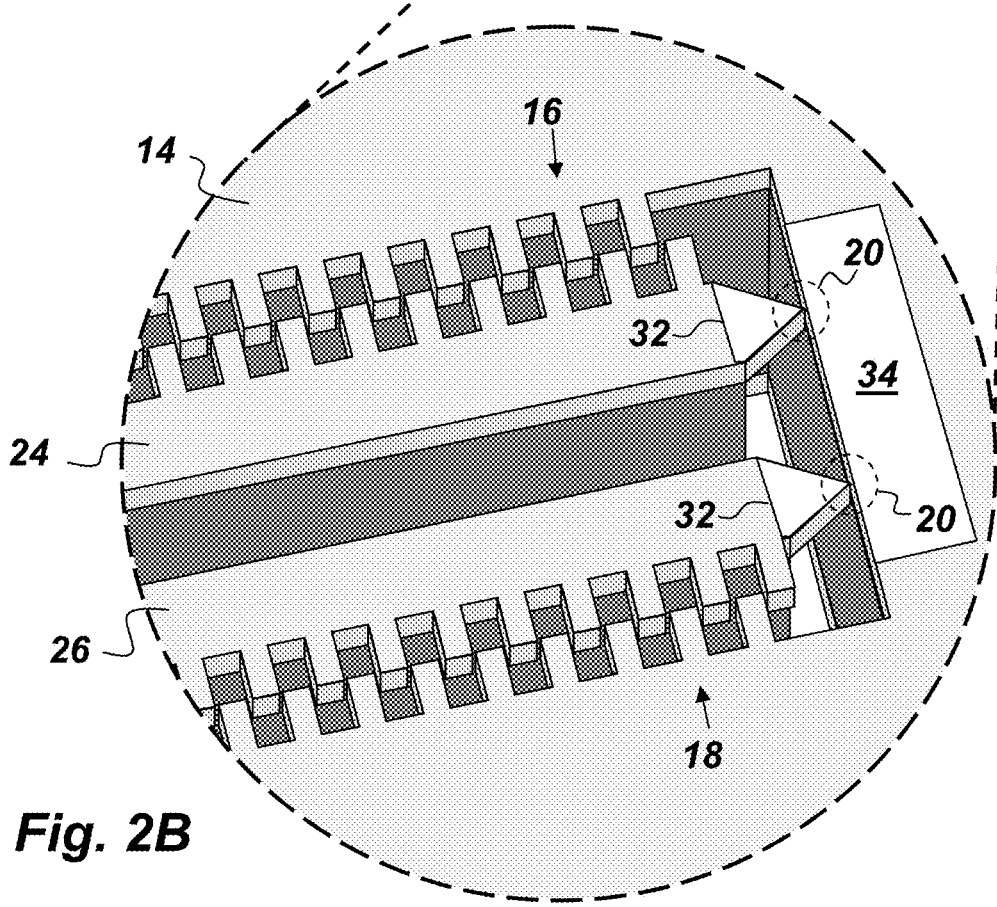

FIGS. 2A-2B represent a perspective view of an example MEMS embodiment of the gyroscope 10. In the embodiment shown, the first and second drivers 16 and 18 are capacitive comb drives, and the digital triggers 20 are stacked pairs of electron tunneling switches (only the top switch is visible in FIG. 2B) capable of generating a finite width current pulse which "tunnels from conductive tips 32 on the first and second prongs 24 and 26 to a conductive plane 34 on the frame 12.

Figure 3A:
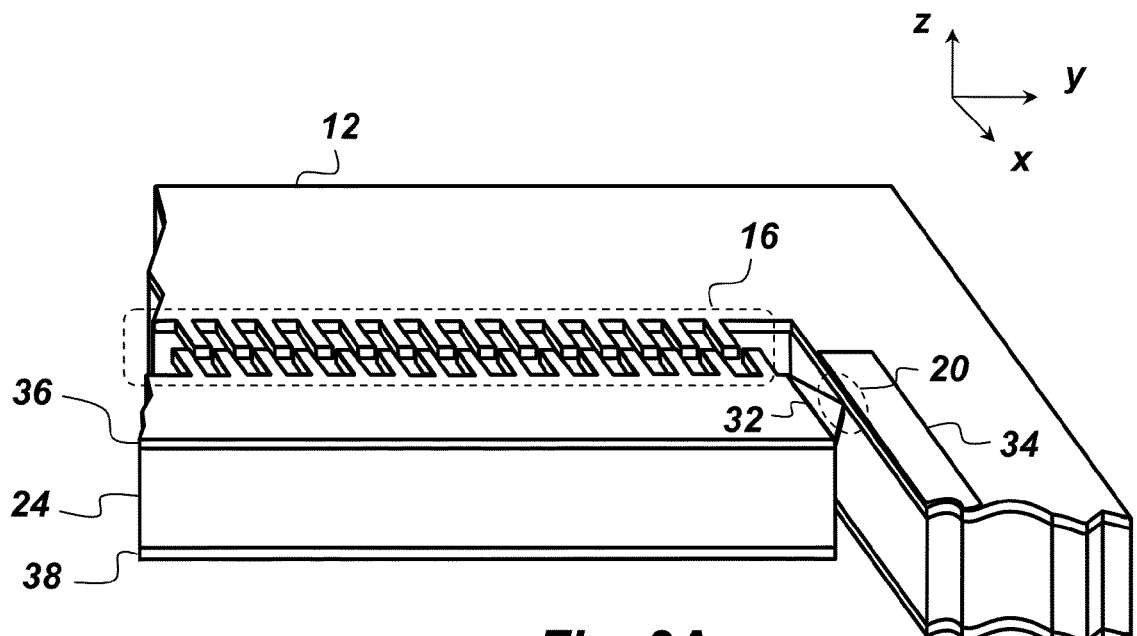
FIG. 3A is a partial perspective view of the MEMS embodiment of the gyroscope depicted in FIGS. 2A and 2B.
Figure 3B:
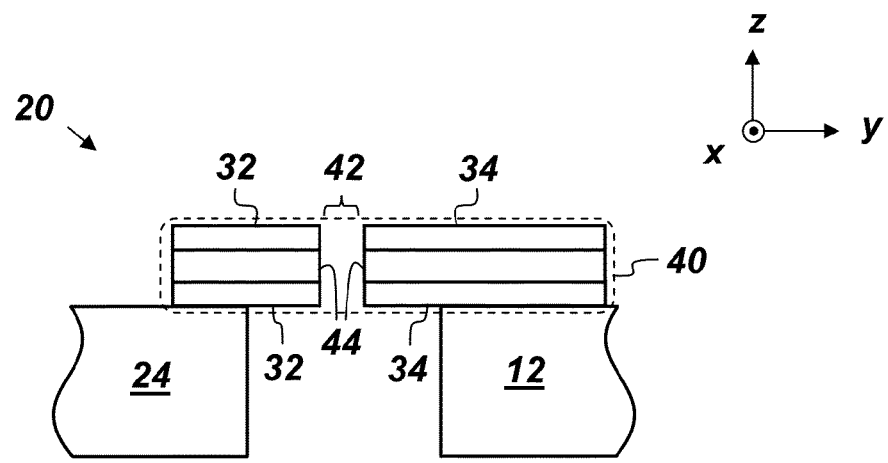
FIG. 3B is a side view of an embodiment of a digital trigger.

FIG. 3A is a partial perspective view of the MEMS embodiment of the gyroscope 10 depicted in FIGS. 2A and 2B. FIG. 3A shows the orientation of the first prong 24 with respect to the frame 12. In this embodiment a conductive layer 36 and an optional lower conductive layer 38 are also depicted. FIG. 3B is a side view of one embodiment of a digital trigger 20 such as may be used in the example embodiment of the gyroscope 10 depicted in FIGS. 2A, 2B, and 3A. In this embodiment, the digital trigger 20 comprises a pair of electron tunneling switches 40. The pair of electron tunneling switches 40 comprises a stacked conductive tips 32, and stacked conductive planes 34. The tips 32 and the planes 34 are separated from each other in the y-direction by a gap 42. The tips 32 and the planes 34 are separated from each other in the z-direction by a dielectric layer 44.

Figure 4A:
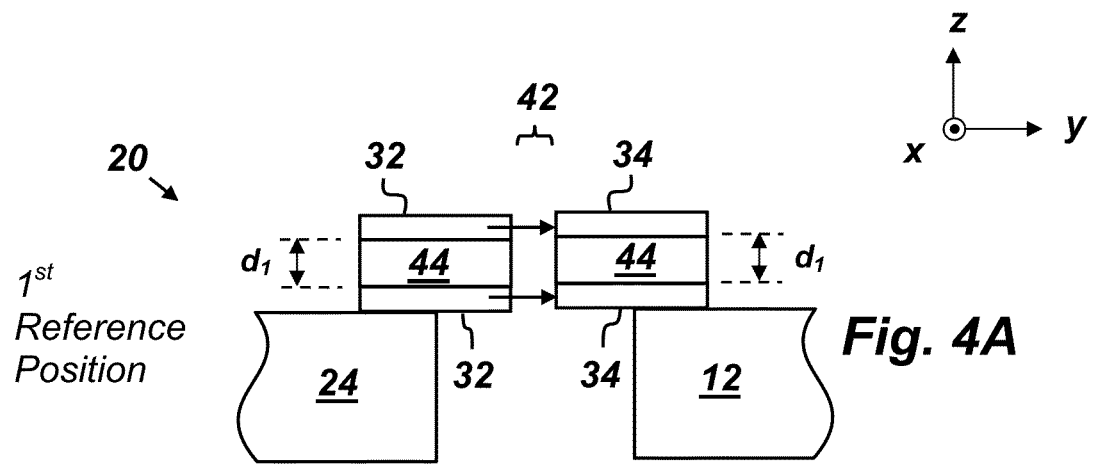
FIGS. 4A-4C illustrate side views of various reference positions of the digital trigger shown in FIG. 3B.
Figure 4B:
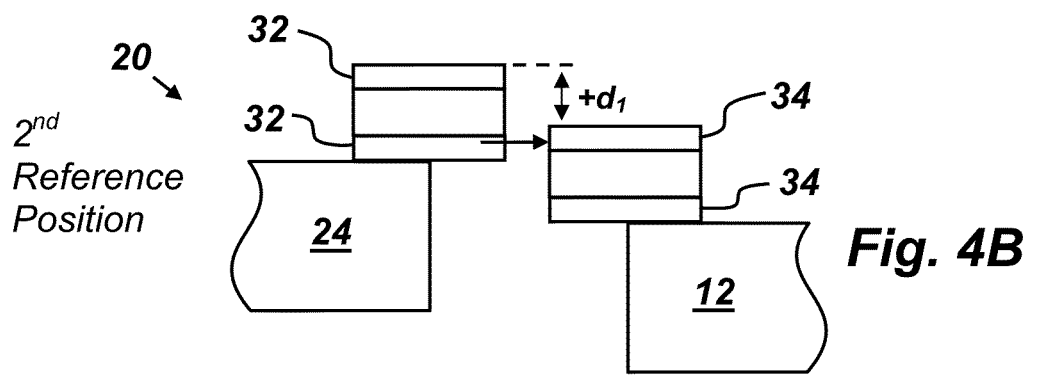
Figure 4C:
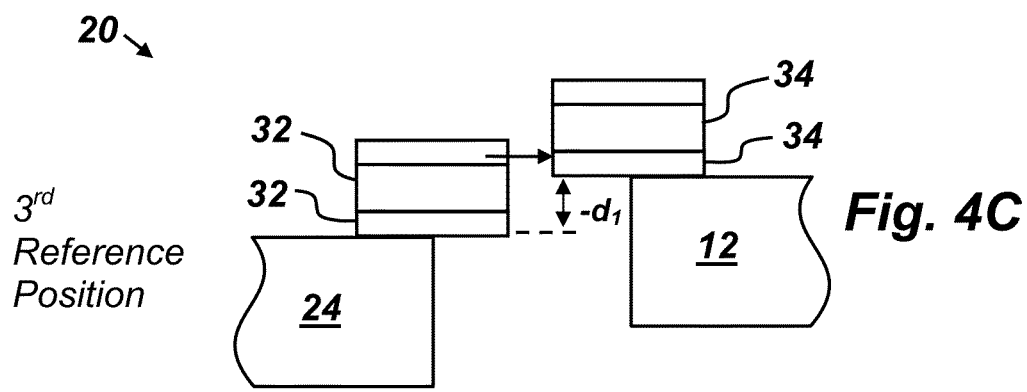

FIGS. 4A-4C illustrate an embodiment of the digital trigger 20 shown in FIG. 3B where the pair of electron tunneling switches is configured to pass through multiple closed states corresponding to multiple reference positions of the first prong 24 with respect to the frame 12 during a single oscillation period. When the first prong 24 is in the first reference position with respect to the frame 12 the tunneling tips 32 are aligned with the conductive planes 34 and the digital trigger 20 is in a closed state such that a current pulse may pass from the tips 32 to the planes 34, as depicted by the arrows. The electron tunneling tips 32 are aligned with each other in the z-direction and separated from each other in the z-direction by a distance $d_1$. The conductive planes 34 are also aligned with each other in the z-direction and separated from each other in the z-direction by the distance $d_1$.

When the first prong 24 is in the first reference position, or zero force position, such as is depicted in FIG. 4A, a current pulse passes from the each of the tunneling tips 32 over the gap 42 to a corresponding plane 34. This embodiment of the digital trigger 20 also comprises second and third reference positions of the first prong 24 with respect to the frame 12. The first prong 24 is in the second reference position when the first prong 24 is displaced from the first reference position in the z-direction by the distance $+d_1$, such as is shown in FIG. 4B. In the second reference position, the digital trigger 20 is in a closed state such that a current pulse may pass from the lower of the two tips 32 to the upper of the two planes 34. The first prong 24 is in the third reference position when the first prong 24 is displaced in the z-direction by the distance $-d_1$, such as is shown in FIG. 4C. In the third reference position, the digital trigger 20 is in a closed state such that a current pulse passes from the upper of the two tips 32 to the lower of the two planes 34.

Figure 5:
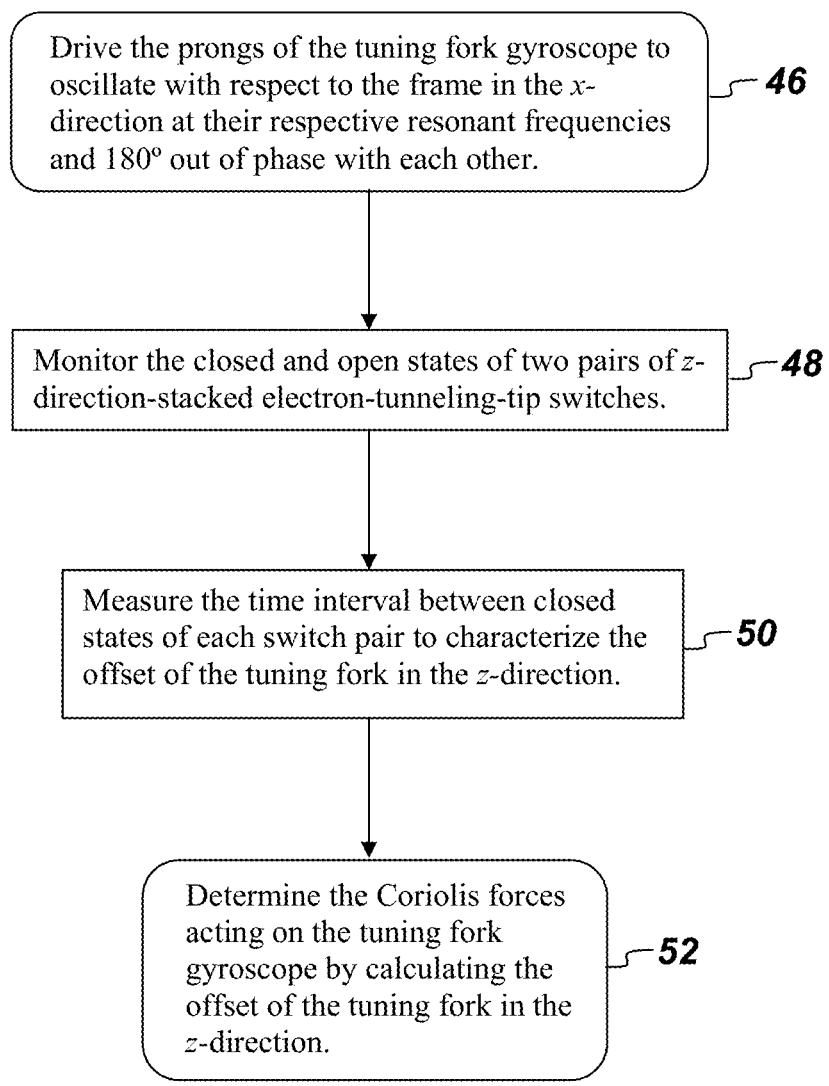
FIG. 5 is a flowchart illustrating one example of how the gyroscope depicted in FIGS. 2A-3B may be used for time-domain inertial sensing.

FIG. 5 is a flowchart illustrating one example of how the gyroscope 10 depicted in FIGS. 2A-3B may be used for time-domain inertial sensing. The first step 46 provides for driving the first and second prongs 24 and 26 of the tuning fork 14 to oscillate with respect to the frame 14 in the x-direction, such that the prongs oscillate at their respective resonant frequencies and 180° out of phase with each other. The second step 48 provides for monitoring the closed and open states of the two pairs of electron-tunneling-tip switches 40. The third step 50 provides for measuring the time interval between closed states of each switch pair 40 to characterize the offset of the tuning fork 14 in the z-direction. The fourth step 52 provides for determining the Coriolis forces acting on the tuning fork gyroscope 10 by calculating the offset of the tuning fork 14 in the z-direction. The oscillation amplitude calculation of a given prong in the z-direction may be based on the time interval between successive closed states of the prong's switch pair 40. The Coriolis force acting on a given prong may be expressed as a change in amplitude of the z-direction oscillation of the given prong when both the z-direction resonant frequency and the x-direction resonant frequency of the given prong match. The Coriolis force may be expressed as the z-direction offset of the resonant oscillation of the tuning fork 14 in the z-direction when the resonant frequency of a given prong in the z-direction is much greater than that of the prong's resonant frequency in the x-direction.

Figure 6:
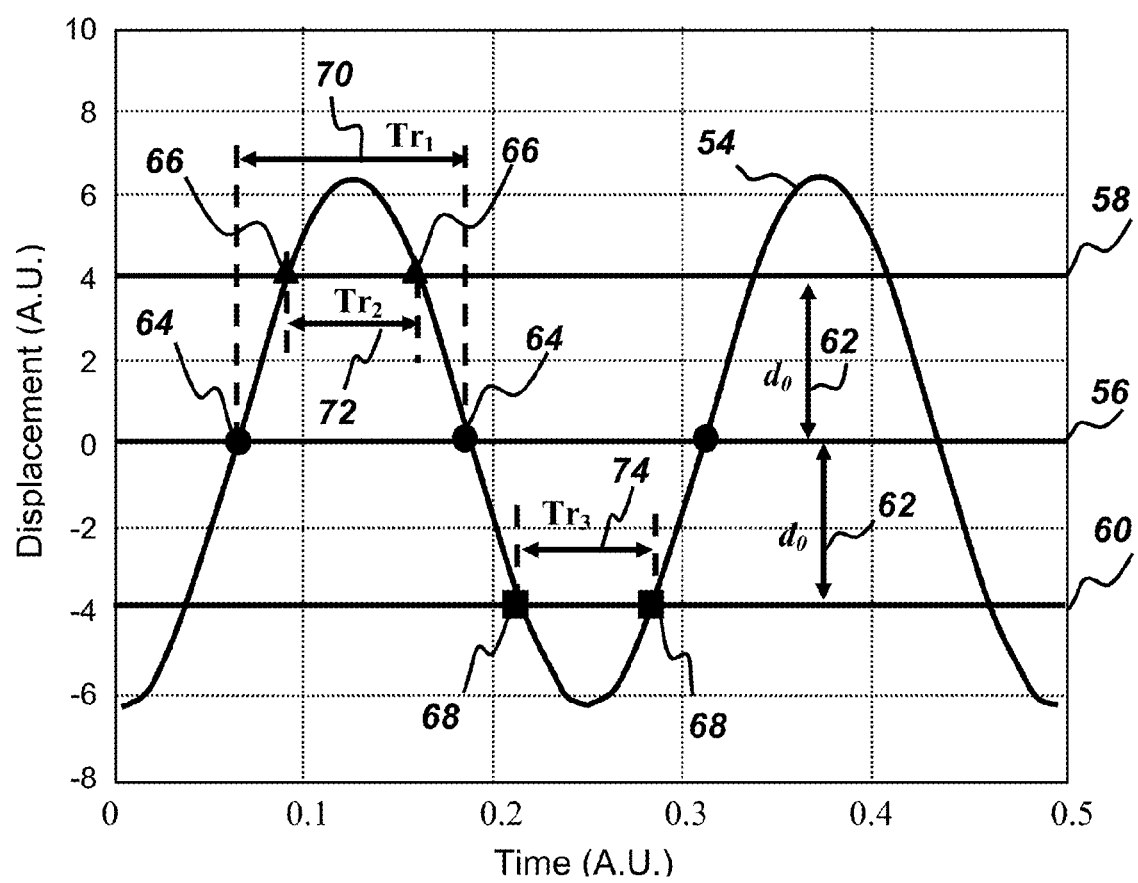
FIG. 6 is a plot of the displacement of a tuning fork with respect to a frame.

FIG. 6 is a plot of the displacement of the tuning fork 14 with respect to the frame 12. The exemplary time domain-based method represented in FIG. 5 is in the context of sensing a force, and relies on measuring deflection (also referred to as the bias) of the tuning fork 14, which may also be characterized as a proof mass/spring-based oscillator that is being driven at a frequency $f_{drv}$. In one configuration, the oscillations of the oscillator are substantially harmonic. Alternatively, the oscillations may be substantially non-harmonic or (e.g., not perfect sinusoids).

As a brief aside, in classical mechanics, a harmonic oscillator is a system that, when displaced from its equilibrium position, experiences a restoring force F that is proportional to the displacement x as:

$$F = -kx. \qquad \text{(Eqn. 1)}$$

If the restoring force is the only force acting on the oscillator system, the system is referred to as a simple harmonic oscillator, and it undergoes simple harmonic motion, characterized by sinusoidal oscillations about the equilibrium point, with constant amplitude and constant frequency $f_0$ (which does not depend on the amplitude):

$$f_0 = \frac{1}{T_0} = \frac{1}{2\pi}\sqrt{\frac{k}{m}}. \qquad \text{(Eqn. 2)}$$

where:
k is the spring constant;
m is the oscillator mass
$f_0$ is the oscillator resonant frequency; and
$T_0$ is the corresponding period of oscillations.

In the plot shown in FIG. 6 ("harmonic" variant), the driving frequency $f_{drv}$ is configured to match the natural resonance frequency $f_0$ of the proof mass/spring-based harmonic oscillator causing a sinusoidal motion of the proof mass, as shown by the trace 54. A system driven in-resonance typically requires a high-quality factor (Q) oscillating proof-mass system. It will be appreciated, however, that for this embodiment, literally any driving signal that maintains the oscillator in resonance may be used.

In another example embodiment (not shown), the proof mass of the oscillator may be driven "off-resonance", which provides, inter alia, precise control of the oscillation period and, hence, control of sensor accuracy. Off-resonance driven systems typically require a lower Q oscillator.

In the absence of any external forcing, the proof mass trajectory is centered at a reference position 56, as shown in FIG. 6. The oscillatory motion of the proof mass is measured using "triggering" events that are generated when the mass passes through trigger points corresponding to predefined physical locations such as the first, second, and third reference positions depicted in FIGS. 4A-4C. The first reference position corresponds to a neutral (also referred to as a zero-force) point 56. The second reference position corresponds to a positive trigger point 58. The third reference position corresponds to a negative trigger point 60. In the plot of FIG. 6, the trigger positions 58 and 60 are configured at the same predetermined distance $d_0$ 62 (also referred to as the trigger gap or trigger spacing) away from the first reference position 56. As will be appreciated by those skilled in the art, other trigger configurations are compatible with the invention, such as, for example, asymmetric and/or multiple sets of positive and or negative trigger points 58, 60. In one specific variant, a single trigger position (such as the first reference position 56 for example) is utilized.

In the plot of FIG. 6, the harmonic oscillations of the tuning fork/proof mass (as shown for example by the un-forced trace 54) causes each of the triggering points 56, 58, 60 to generate a pair of triggering events marked by the circles 64, triangles 66, and squares 68, respectively, for each full cycle of mass oscillation.

Timing of the triggering events 64, 66, 68 is measured using the same reference clock, and periods between successive crossings of the respective trigger points are computed. That is, the period $Tr_1$ (denoted by the reference character 70) is determined by subtracting the times of the successive trigger events 64 (which correspond to the mass crossing of the reference trigger point 56). The period $Tr_2$ (denoted by the reference character 72) is determined by subtracting the times of the successive trigger events 66 (which correspond to the mass crossing of the positive trigger point 58). The period $Tr_3$ (denoted by the reference character 74) is determined by subtracting the times of the successive trigger events 68 (which correspond to the mass crossing of the reference point 60).

When the proof mass is subjected to an external force $F_{ext}$ of a frequency $f_{ext} < f_{drv}$, the equilibrium point of the proof mass harmonic oscillations is shifted from the reference zero-force position. That is, a low frequency forces acting on the proof mass results in a low frequency shift (also referred to as the deflection) of the equilibrium point. Because applied inertial forces impact the DC bias of the simple harmonic oscillator, it is by definition immune to other zero-mean frequencies that may be coupled into the harmonic oscillator; that is, any high frequency oscillation centered around mean value (e.g., zero) will average to that mean value.

Figure 7:
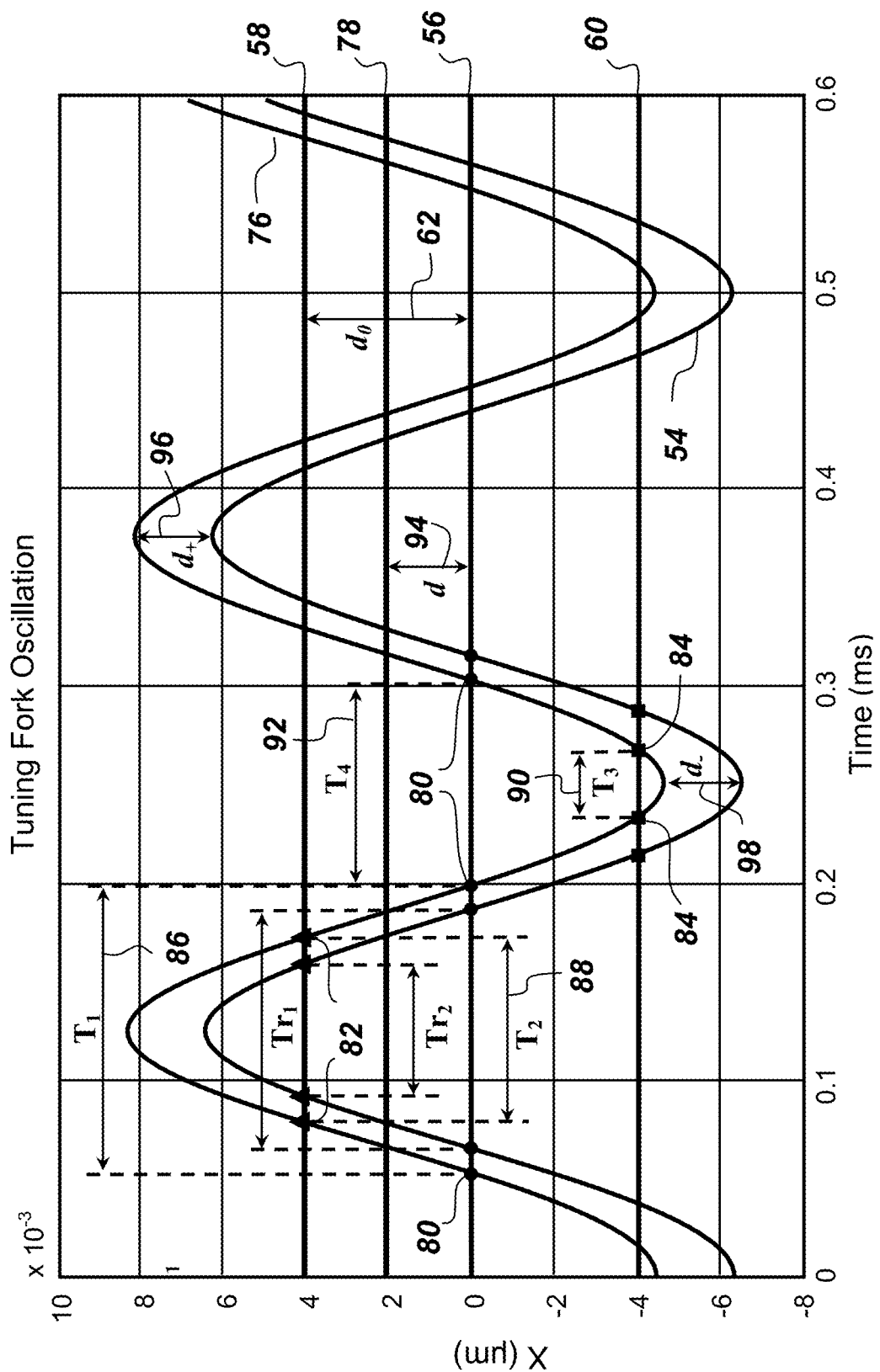
FIG. 7 is a plot of tuning fork displacement against time in the presence of external forcing.

FIG. 7 is a plot of tuning fork displacement against time in the presence of external forcing. As indicated by the trace 76 the oscillations of the proof mass in the presence of external forcing are shifted from the zero-force oscillations trajectory. As a result, the forced oscillation trace 76 is centered around a level (indicated by the line 78) that is deflected from the reference point 56.

Similar to the mass motion described with respect to FIG. 6, harmonic oscillations of the proof mass in the presence of external forcing (e.g., the trace 76 in FIG. 7) cause each of the triggering points 56, 58, and 60 to generate a pair of triggering events marked by circles 80, triangles 82, and squares 84, respectively, for each full cycle of mass oscillation. The external force acts to create an offset (bias) in the oscillator, which is detected by measuring the time periods between successive triggering points (such as the points 80, 82, and 84 in FIG. 7), as described in detail below.

Measured timing of the triggering events 80 is used to compute the period $T_1$ (denoted by the arrow 86), which corresponds to the forced mass crossing of the reference trigger point 56 on the upswing of the mass oscillation. The period $T_2$ (denoted by the arrow 88) is determined by subtracting the times of the successive trigger events 82, and T2 corresponds to the mass crossing of the positive trigger point 58. The period $T_3$ (denoted by the arrow 90) is determined by subtracting the times of the successive trigger events 84, and it corresponds to the mass crossing of the reference point 60. The period $T_4$ (denoted by the arrow 92) is determined by subtracting the times of the successive trigger events 80 and corresponds to the forced mass crossing of the reference trigger point 56 on the downswing of the mass oscillation, as illustrated in FIG. 7.

In one exemplary approach, the measured periods between successive trigger events (i.e., $T_1$ through $T_4$) are used to obtain an estimate of the proof mass deflection d (denoted by the arrow 94 in FIG. 7) from the reference point. The proof mass deflection $d_+$ around the oscillation maximum (as depicted by the arrow 96 in FIG. 7) is obtained by combining the upswing reference point crossing period $T_1$ and the positive trigger point 58 crossing period $T_2$ as follows:

$$d_+ = A_+ \cos\frac{\pi T_1}{P}, A_+ = \frac{d_0}{\cos\frac{\pi T_2}{P} - \cos\frac{\pi T_1}{P}}, \quad \text{(Eqn. 3)}$$

where: $d_0$ is the distance between the reference trigger point and the positive trigger point (the trigger gap);
$A_+$ is the amplitude of the oscillations at the oscillation maxima;
P is the period of oscillations defined as $P=T_1+T_3$;
$d_+$ is the proof mass deflection estimate around the oscillation maxima;
$T_1$ is the upswing reference point crossing period; and
$T_2$ is the positive trigger point crossing period.
Similarly, the proof mass deflection $d_-$ around the oscillation minimum is (as depicted by the arrow 98 in FIG. 7) obtained by combining the upswing reference point crossing period $T_3$ and the negative trigger point crossing period $T_4$ as follows:

$$d_- = A_{-0}\cos\frac{\pi T_3}{P}, A_- = \frac{d_0}{\cos\frac{\pi T_4}{P} - \cos\frac{\pi T_3}{P}}, \quad \text{(Eqn. 4)}$$

where: $d_0$ is the trigger gap;
$A_-$ is the amplitude of the oscillations at the oscillation minima;
P is the period of oscillations defined as $P=T_1+T_3$;
$d_-$ is the proof mass deflection estimate around the oscillation minima;
$T_3$ is the downswing reference point crossing period; and
$T_4$ is the negative trigger point crossing period.

In one variant, two independent estimates, $d_+$ and $d_-$, are used to provide deflection measurements twice in each cycle (which may or may not be every half cycle) of oscillations, hence improving sensor frequency response. In another variant, the independent estimates $d_+$, $d_-$ are combined to produce an averaged deflection d thereby reducing measurement short term error. In yet another variant, an averaging window of variable length is used to further improve measurement precision.

In the deflection estimations according to Eqns. 3 and 4, the period of oscillation P is measured every oscillation cycle and the periods $T_1$ through $T_4$ are defined in FIG. 7. Note that the calculated deflection is independent of the amplitude of oscillation.

In one embodiment useful for acceleration force measurements, the accelerations corresponding to the deflection derived from the Eqns. 3 and 4 are obtained as follows:

$$a_+ = d_0\left(\frac{2\pi}{P}\right)^2 \frac{\cos\frac{\pi T_1}{P}}{\cos\frac{\pi T_1}{P} - \cos\frac{\pi T_2}{P}}, \quad \text{(Eqn. 5)}$$

$$a_- = d_0\left(\frac{2\pi}{P}\right)^2 \frac{\cos\frac{\pi T_3}{P}}{\cos\frac{\pi T_4}{P} - \cos\frac{\pi T_3}{P}} \quad \text{(Eqn. 6)}$$

The derivation of Eqns. 3 and 4 assumes that the external force is constant throughout the measurements of $T_1$ through $T_4$, which places a limit on the highest frequency of the external force that can be accurately resolved using these equations. Therefore, in the case of a continuous driving signal, it is necessary to select a driving frequency $f_{drv}$ that is higher than the maximum expected forcing frequency: i.e. $f_{ext} < f_{drv}$.

As is seen from Eqns. 3 and 4, the deflection estimates utilize ratios of measured period between reference events $T_1$ through $T_4$ and the period of forced oscillations P. Provided that all of these time intervals are obtained using the same reference clock, the final deflection (and, therefore, force) estimate advantageously becomes insensitive to clock systematic errors, such as, for example, drift due to aging, temperature, or other environmental changes. The calculation method of Eqns. 3 and 4 is also insensitive to changes in resonant frequency with temperature or other environmental effects.

In another embodiment of the invention, a clock jitter or variation (e.g., on the order of no more than a half clock cycle in one implementation) is purposely introduced into the reference clock such that low frequency inertial forces applied to the sensor can be averaged over time. As is well known, quantization noise or error cannot be averaged; introduction of such jitter advantageously mitigates or eliminates such quantization error, thereby allowing for effective averaging (and hence increasing the accuracy of the device).

Figure 8A:
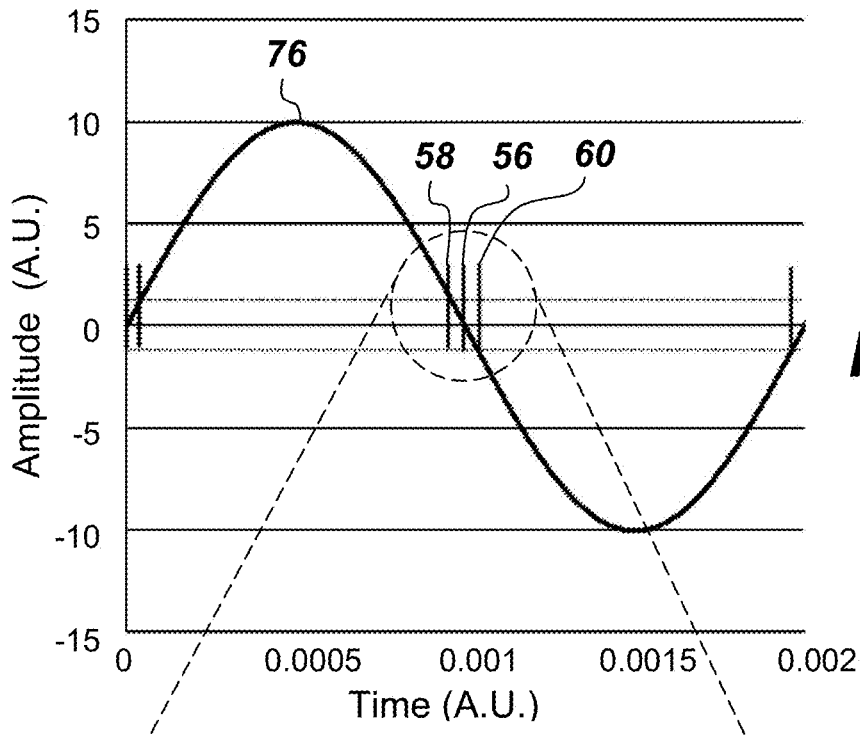
FIG. 8A is a plot of the oscillation amplitude of a tuning fork with respect to a frame.
Figure 8B:
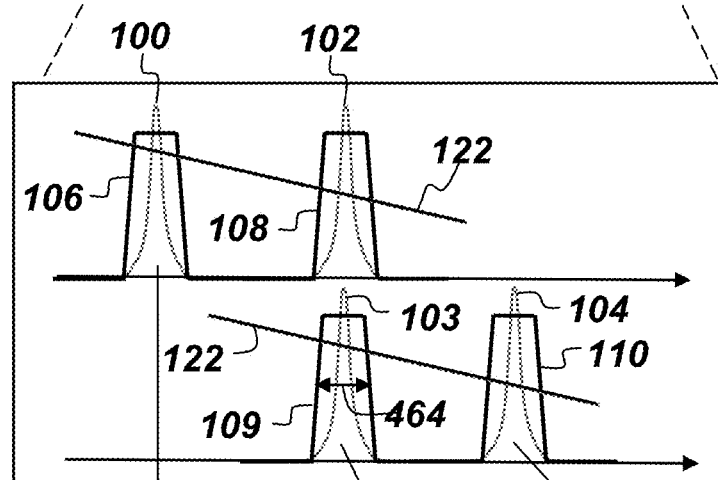
FIG. 8B is, in part, a pictorial representation of triggering events.
Figure 8B:
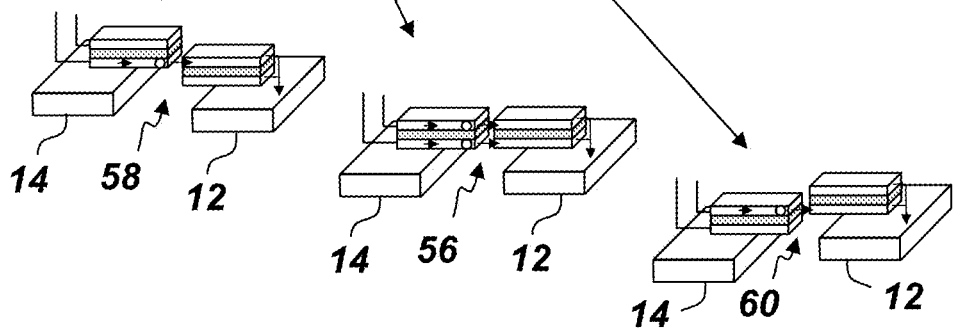

FIG. 8A is a plot of the oscillation amplitude of the tuning fork 14 with respect to the frame 12 showing the three triggering points 56, 58, and 60, described above. FIG. 8B is, in part, a pictorial representation of the triggering events 56, 58, and 60. At trigger event 58 a tunneling discharge pulse 100 tunnels from the tuning fork 14 to the frame 12. At trigger event 56, two tunneling discharge pulses 102 and 103 tunnel from the tuning fork 14 to the frame 12. At trigger event 60, a tunneling discharge pulse 104 tunnels from the tuning fork 14 to the frame 12. As the pulses 100, 102, 103, and 104 may differ in amplitude due to, for example, variations in applied tunneling voltage (voltage noise) and/or tunneling distance, low noise current amplifiers may be used to amplify the discharge pulses to the rail (that is the maximum current level value of the sensing circuit) so as to produce the amplified pulses 106, 108, 109, and 110 respectively, which exhibit substantially rectangular shapes, as shown in FIG. 8B. Although the amplitude information is lost, the amplified square pulses 106, 108, 109, and 110 are advantageously well suited for interfacing with digital circuits.

The tuning fork gyroscope 10 provides a compact, mechanically-isolated design to measure the Coriolis force caused by rotation of the gyroscope 10. Rotation along the length of the first and second prongs 24 and 26 will cause a Coriolis force raising or lowering the prongs out of the original plane (e.g., the x-y plane shown in FIG. 1) 90° out of phase with the prong vibration. If the resonant frequency of a given prong vibrating in and out of the plane is matched to the resonant frequency of the prong vibrating in the plane, then the amplitude of the vertical vibration should be proportional to the total angle rotated. If the two orthogonal vibrations are significantly off resonance from each other, then the vertical offset of the prong will be proportional to the change in rotation times the horizontal prong velocity.

Figure 9:
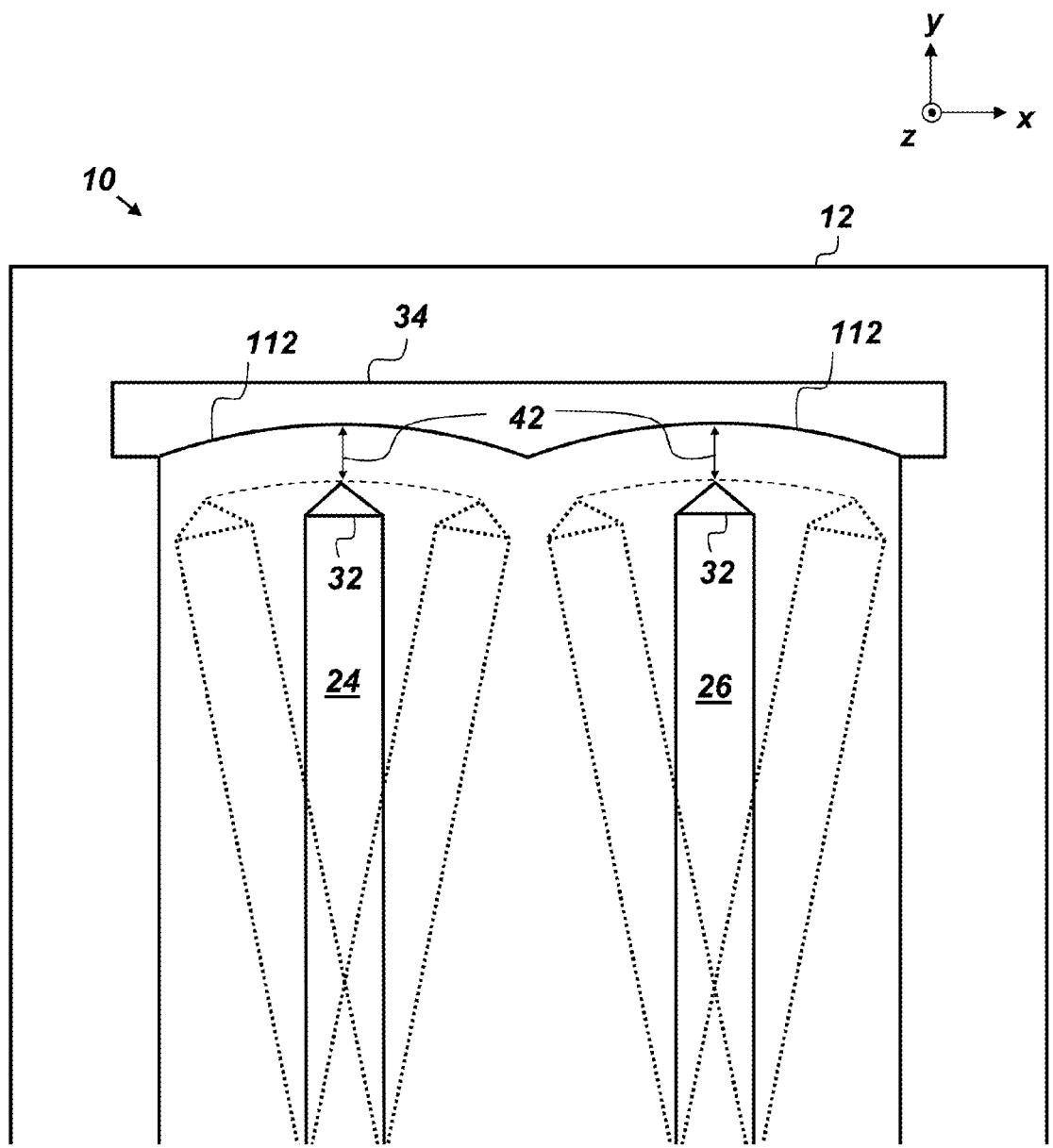
FIG. 9 is a top view of an embodiment of a tuning fork gyroscope.

FIG. 9 is a top view of an embodiment of the gyroscope 10 wherein the digital position triggers 20 are located on the free ends of the first and second prongs 24 and 26. In this embodiment, an edge 112 of the conductive plane 34 is curved such that as the prongs oscillate in the x-direction the size of the gap 42 remains substantially the same.

Figure 10:
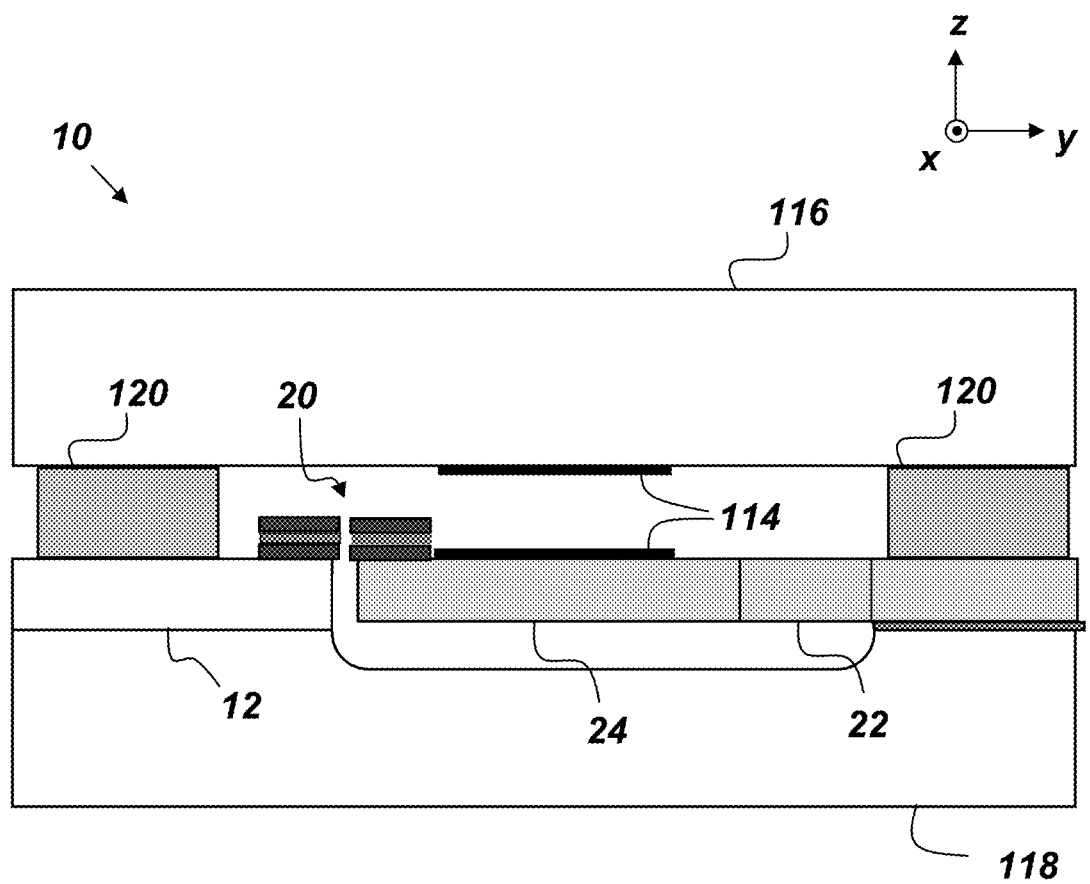
FIG. 10 is a side cross-section side view of an embodiment of a tuning fork gyroscope.

FIG. 10 is a side cross-section side view of an embodiment of the gyroscope 10 further comprising a third driver 114 configured to drive the tuning fork 14 to oscillate with respect to the frame 12 in the z-direction. This embodiment of the gyroscope 10 also comprises a capping wafer 116, an integral frame/base wafer assembly 118, and a bonding layer 120.

Figure 11:
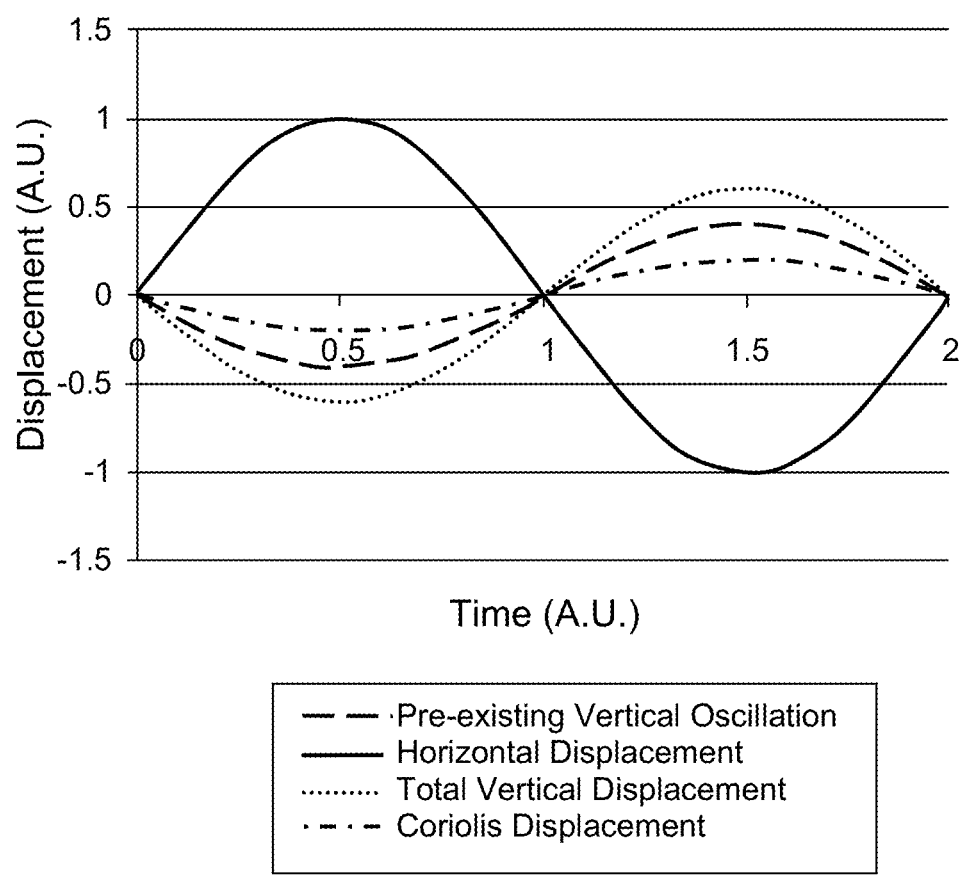
FIG. 11 is a plot of the displacement of conductive tips over time with respect to a conductive plane.

FIG. 11 is a plot of the displacement of the conductive tips 32 in the z-direction over time with respect to the conductive plane 34 of one of the digital triggers 20 depicted in FIGS. 2A-2B. In FIG. 11, the x- and z-direction resonances of the prong to which the digital trigger 20 is coupled are matched. If the z-direction resonant frequency of a given prong matches its x-direction resonant frequency, the Coriolis force due to rotation of the frame 12 about the y-axis will couple into the resonant oscillation and will be expressed as a change in amplitude of the z-direction oscillation of the given prong. The long-dashed line corresponds to pre-existing oscillation of the given prong in the z-direction with respect to the frame 12. The solid line corresponds to the x-direction displacement of the given prong with respect to the frame 12. The dotted line represents the total displacement of the given prong in the z-direction with respect to the frame 12. The dot-dash-dot line corresponds to the displacement of the given prong in the z-direction with respect to the frame 12 attributable to the Coriolis force.

Figure 12:
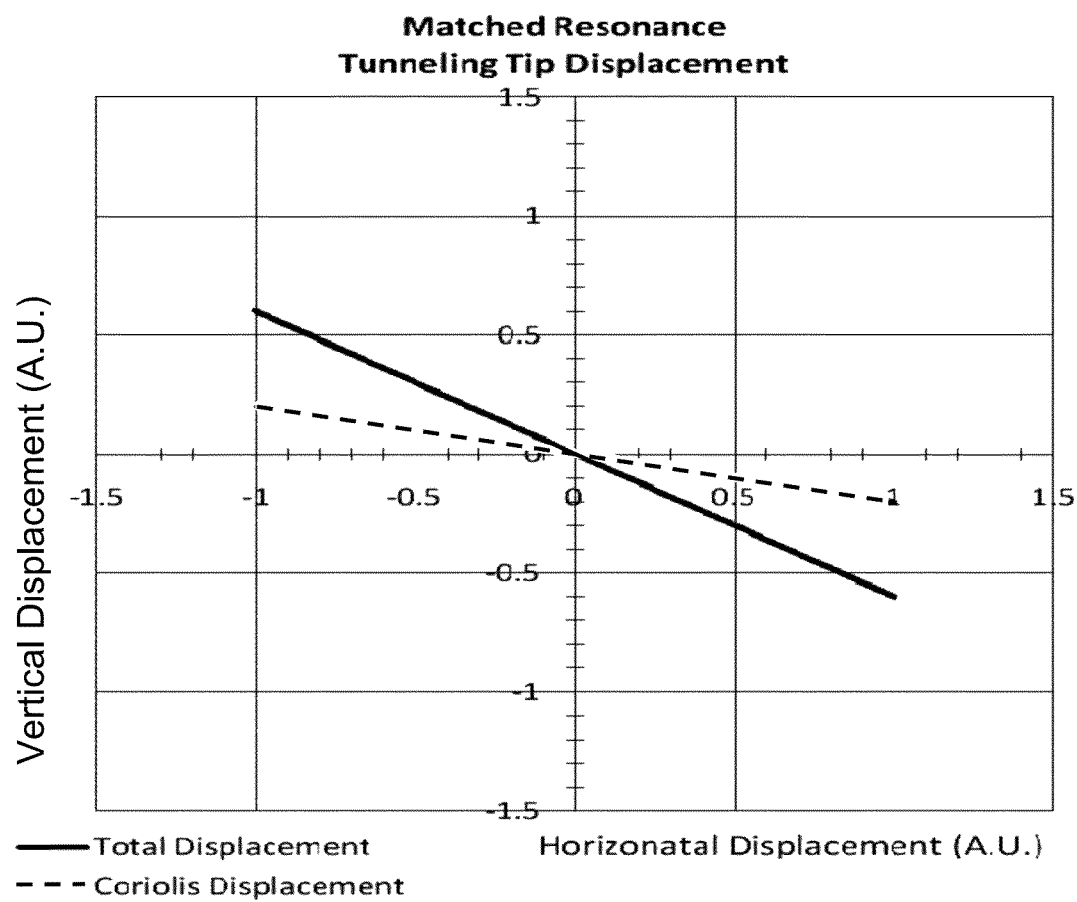
FIG. 12 is a graph showing the displacement of conductive tips.

FIG. 12 is a plot of the z-direction-displacement of the conductive tips 32 with respect to the conductive plane 34 of one of the digital triggers 20 depicted in FIGS. 2A-2B against the x-direction-displacement of the conductive tips 32 with respect to the conductive plane 34. In FIG. 12, the x- and z-direction resonances of the prong, to which the digital trigger 20 is coupled, are matched. The solid line in FIG. 12 corresponds to the total displacement of the given prong with respect to the frame 12. The dashed line in FIG. 12 corresponds to the displacement of the given prong with respect to the frame 12 attributable to the Coriolis force.

Figure 13:
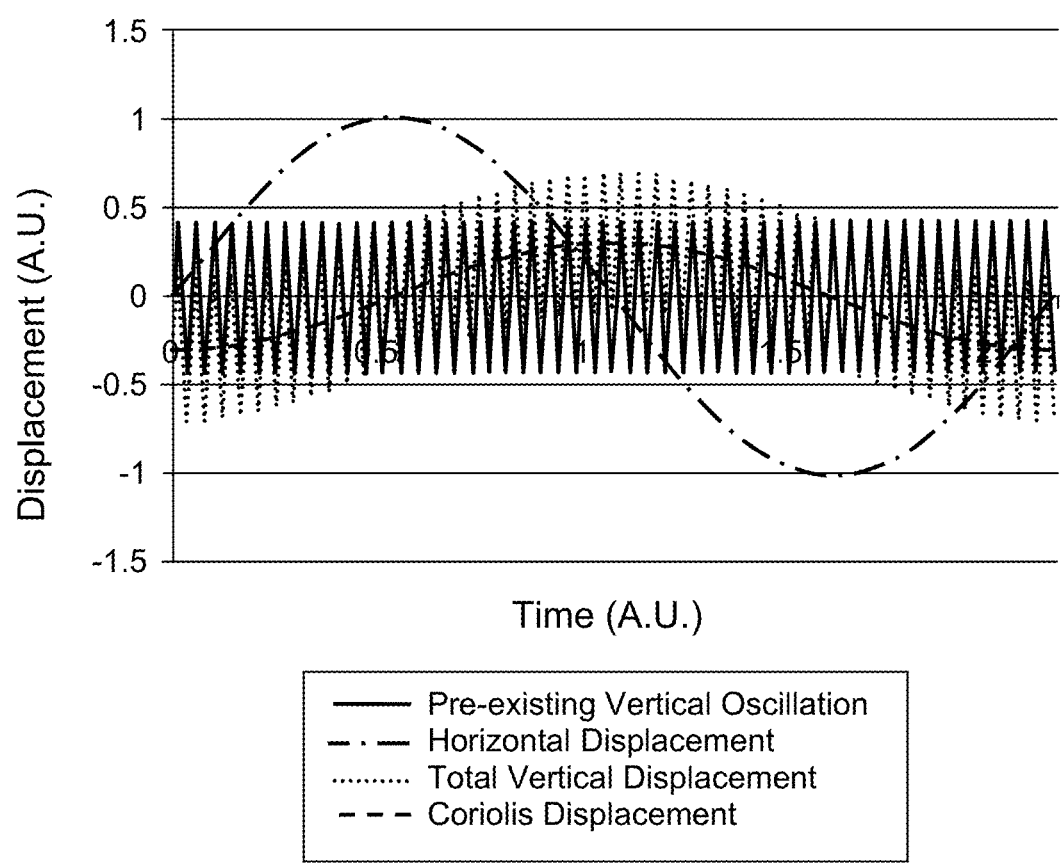
FIG. 13 is another plot of the displacement of conductive tips over time with respect to a conductive plane.

FIG. 13, like FIG. 11, is a plot of the z-direction-displacement over time of the conductive tips 32 with respect to the conductive plane 34 of one of the digital triggers 20 depicted in FIGS. 2A-2B. However, FIG. 13 differs from FIG. 11 in that in FIG. 13, the x- and z-direction resonances of the prong to which the digital trigger 20 is coupled are mis-matched, but instead, the z-direction resonant frequency of the prong is much greater than that of the x-direction resonant frequency. In this scenario, the Coriolis force may be determined by calculating the z-direction offset of a previously initiated resonant z-direction oscillation. The initial vertical and horizontal resonant oscillation of the prong may be induced by using capacitive forcing to an initial vertical and horizontal displacement. Besides capacitive forcing, the initial resonant z-direction oscillation may also be caused by a resonant tone generator, or any other forcing means. By averaging the results from the two prongs (vibrating in the x-direction 180° out of phase) non-rotational acceleration effects can be eliminated from the measurement. The solid line in FIG. 13 corresponds to pre-existing oscillation of the given prong in the z-direction with respect to the frame 12. The dash-dot-dash line in FIG. 13 corresponds to the x-direction displacement of the given prong with respect to the frame 12. The dotted line in FIG. 13 represents the total displacement of the given prong in the z-direction with respect to the frame 12. The dashed line in FIG. 13 corresponds to the displacement of the given prong in the z-direction with respect to the frame 12 attributable to the Coriolis force.

Figure 14:
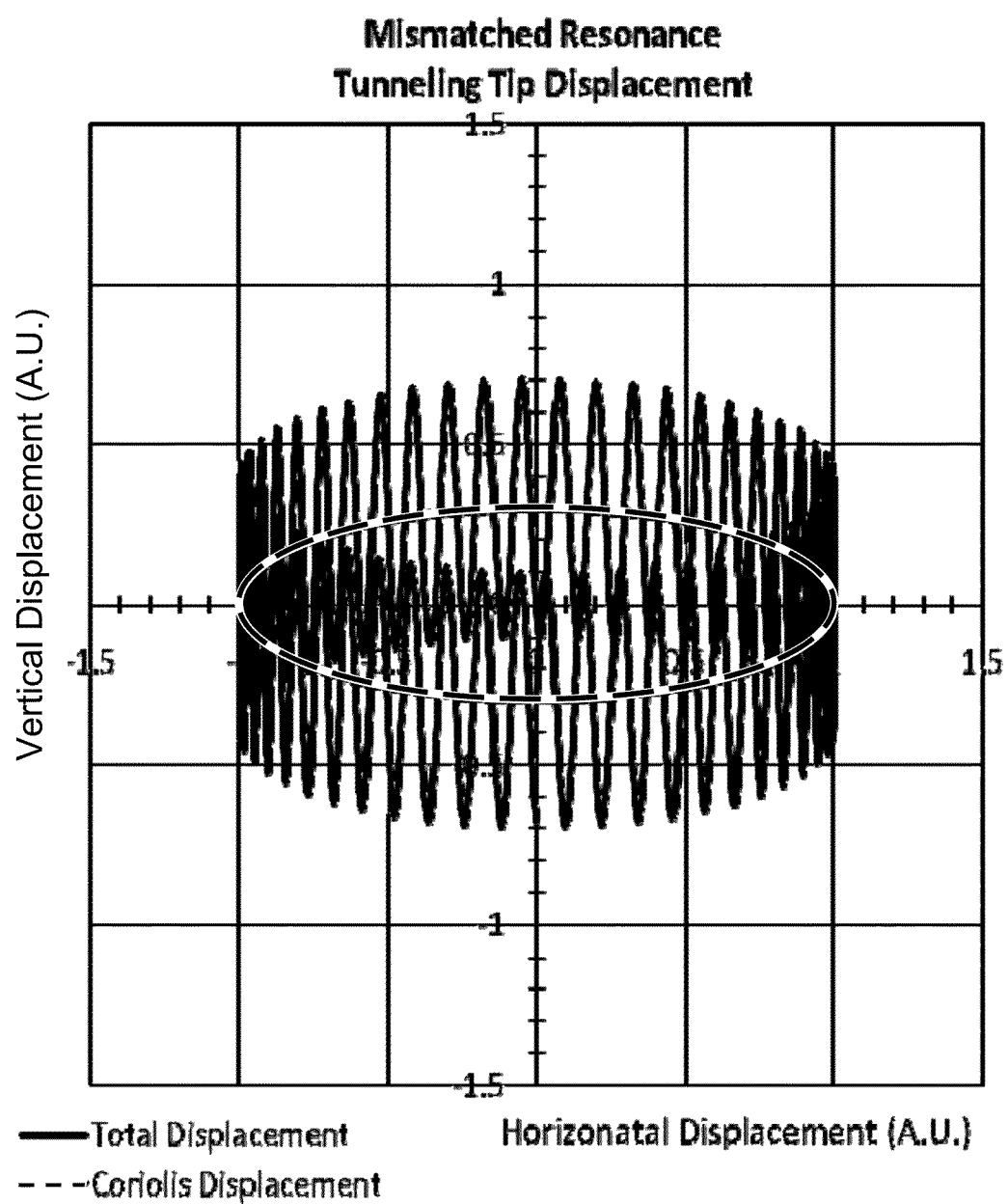
FIG. 14 is another graph showing the displacement of conductive tips.

FIG. 14 is a plot of the z-direction-displacement of the conductive tips 32 with respect to the conductive plane 34 of one of the digital triggers 20 depicted in FIGS. 2A-2B against the x-direction-displacement of the conductive tips 32 with respect to the conductive plane 34 where the x- and z-direction resonances of the prong, to which the digital trigger 20 is coupled, are mis-matched. The solid line in FIG. 14 corresponds to the total displacement of the given prong with respect to the frame 12. The dashed line in FIG. 14 corresponds to the displacement of the given prong with respect to the frame 12 attributable to the Coriolis force.

Figure 15A:
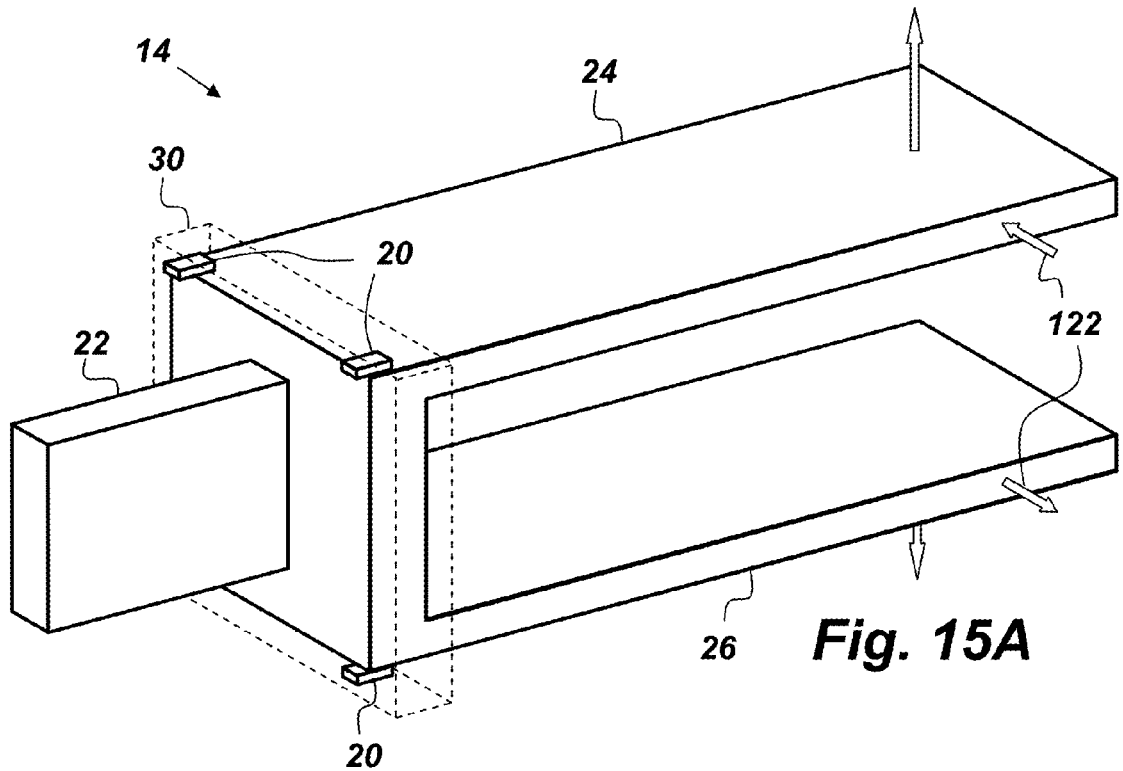
FIGS. 15A-15B are perspective views of an embodiment of a tuning fork gyroscope.
Figure 15B:
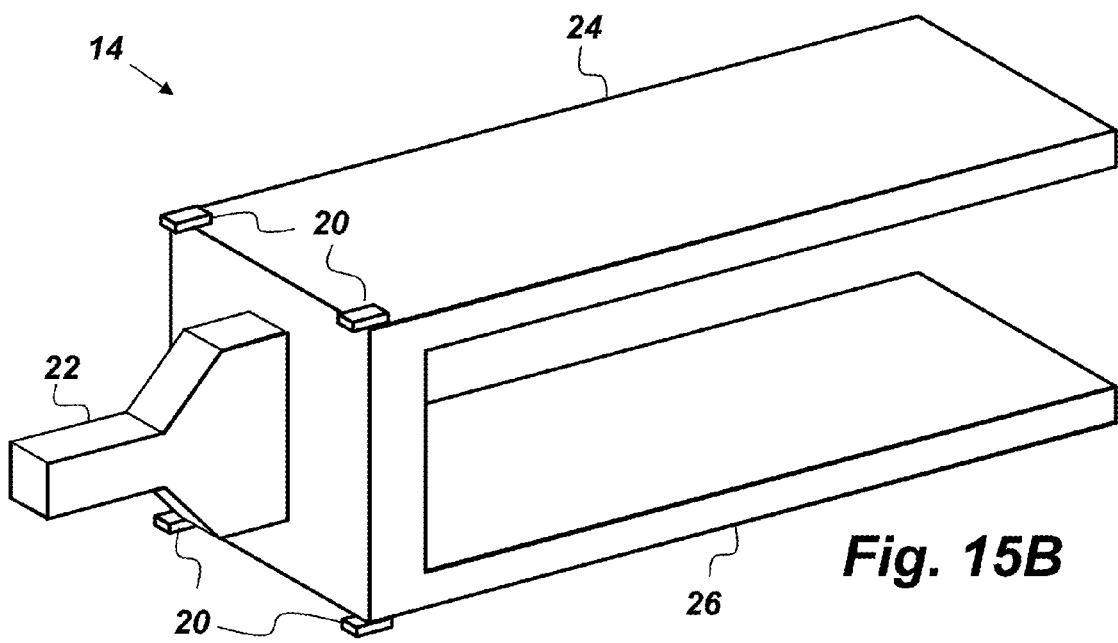

FIGS. 15A-15B are perspective views of an embodiment of the gyroscope 10. In this embodiment, the digital position triggers 20 are located on opposite sides of the distal end 30 of the base 22. Although four digital triggers 20 are depicted in FIGS. 15A-15B, it is to be understood that any number of at least two digital switches 20 may be used with the gyroscope 10, and that the four digital triggers 20 merely represent one example embodiment. In this embodiment, when a torque, due to Coriolis forces 122, is applied to the tuning fork 14, the base twists causing relative motion between the distal end 30 of the base 22 and the frame 12 (not shown in FIGS. 15A-15B) such that the Coriolis forces acting on both prongs may be combined into one time domain measurement. In this embodiment, half of each digital trigger 20 may be mounted to the distal end 30 of the base 22, as shown in FIGS. 15A-15B while the corresponding half of each digital trigger 20 may be mounted to the frame 12 (not shown). Each half of the digital trigger 20 may comprise a z-direction-stacked set of electron tunneling tips. FIG. 15B illustrates how the shape of the base 22 may be altered in order to tune the rotational resonant frequency of the tuning fork 14 to match, or mismatch, the Coriolis force depending on the desired mode of operation.

Figure 16:
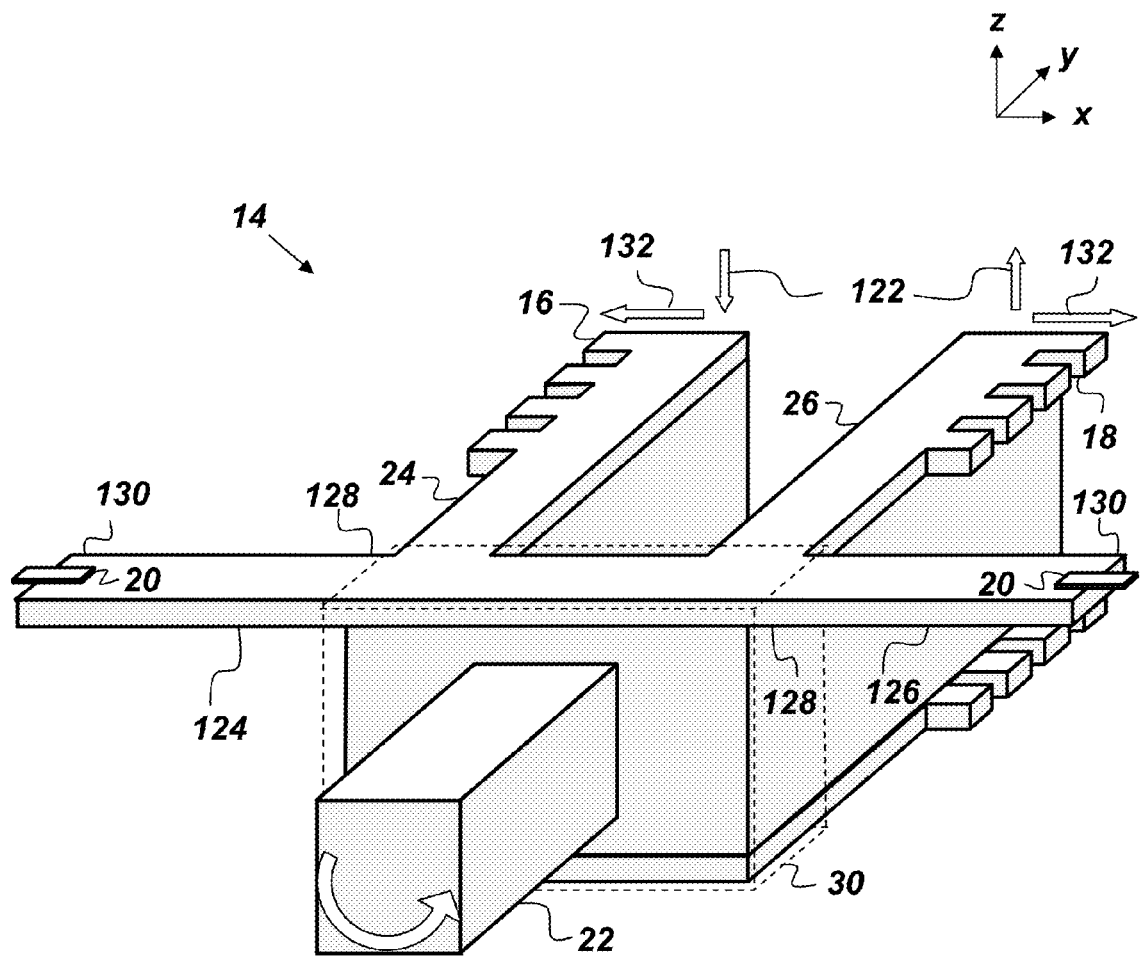
FIG. 16 is a perspective view of an embodiment of a tuning fork gyroscope.

FIG. 16 is a perspective view of an embodiment of the gyroscope 10 wherein the tuning fork 14 further comprises first and second arms 124 and 126 respectively having proximal and distal ends 128 and 130 respectively. The proximal ends 128 of the first and second arms 124 and 126 are coupled to the distal end of the base 30. The position triggers 20 are located on the distal ends 130 of the first and second arms 124 and 126. The first and second prongs 24 and 26 are subjected to oscillating driving forces 132 such that the first and second prongs 24 and 26 oscillate at their resonant frequencies 180° out of phase with each other. When the gyroscope 10 is subjected to a rotation about the y-axis, Coriolis forces 122 cause deflection of the first and second prongs, which in turn causes the tuning fork 14 to twist. The twisting of the tuning fork 14 causes displacement of the distal ends 130 of the first and second arms 124 and 126, which can be measured by the digital triggers 20.

Figure 17:
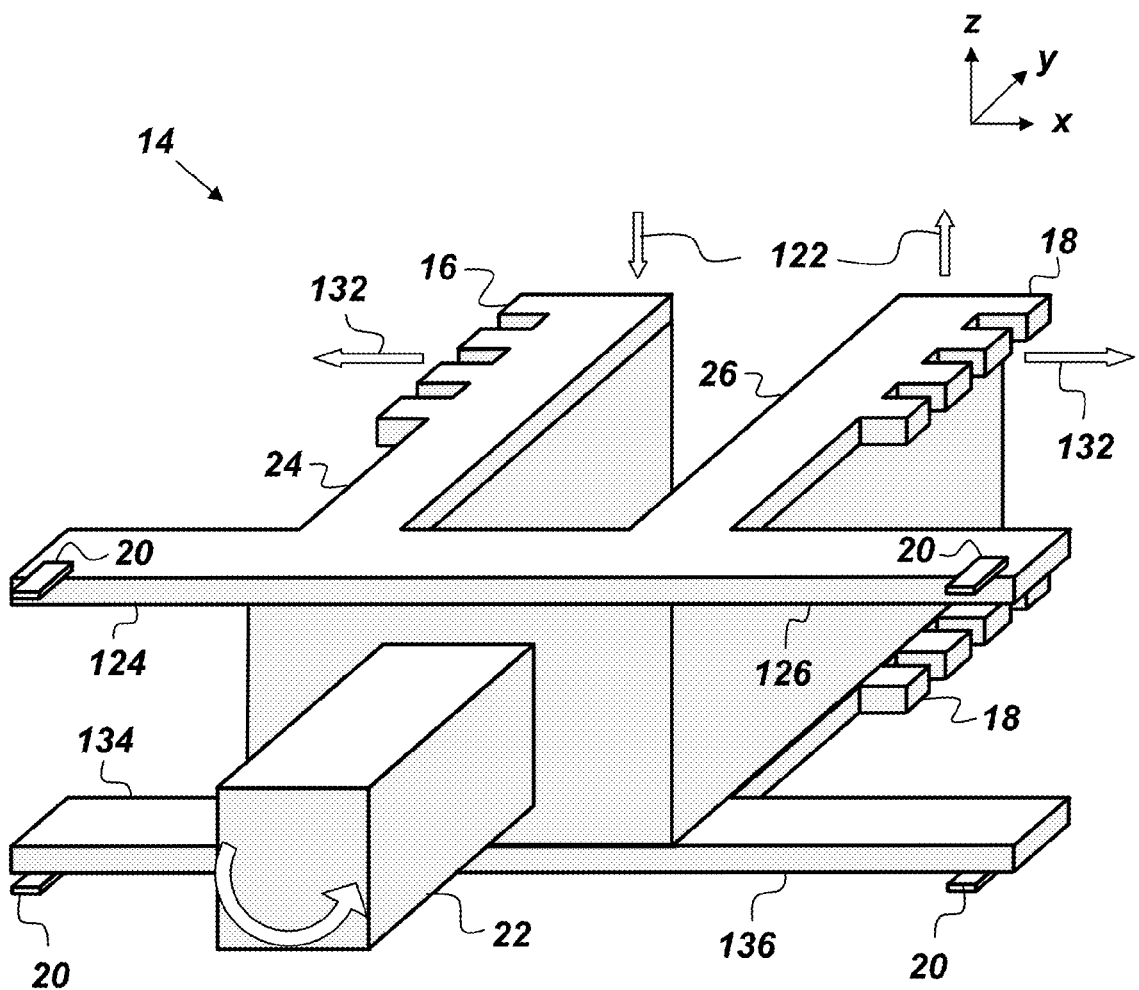
FIG. 17 is a perspective view of another embodiment of a tuning fork gyroscope.

FIG. 17 is a perspective view of an embodiment of the gyroscope 10 wherein the tuning fork 14 further comprises third and fourth arms 134 and 136. FIG. 17 also illustrates an alternate orientation of the digital triggers 20.

From the above description of the gyroscope 10, it is manifest that various techniques may be used for implementing the concepts of gyroscope 10 without departing from its scope. The described embodiments are to be considered in all respects as illustrative and not restrictive. It should also be understood that gyroscope 10 is not limited to the particular embodiments described herein, but is capable of many embodiments without departing from the scope of the claims.

We claim:

1. A gyroscope comprising:
    a frame;
    a tuning fork comprising a base and first and second prongs, wherein the base has proximal and distal ends, and wherein the proximal end is coupled to the frame and the distal end is coupled to the first and second prongs;
    first and second drivers configured to drive the first and second prongs respectively to oscillate with respect to the frame in a first direction, such that the prongs oscillate at respective resonant frequencies of the first and second prongs and 180° out of phase with each other; and
    at least two digital position triggers operatively coupled to the frame and to the tuning fork, wherein each position trigger is configured to experience at least two trigger events during each oscillation of the tuning fork in a second direction, wherein the second direction is orthogonal to the first direction, and wherein each position trigger comprises a pair of second-direction-stacked electron-tunneling-tip switches, wherein each pair of electron-tunneling-tip switches comprises:
        at least two conductive, tuning-fork-mounted elements aligned with, and electrically insulated from, each other in the second direction; and
        at least two conductive, frame-mounted elements aligned with, and electrically insulated from, each other in the second direction such that a triggering event occurs when at least one of the tuning-fork-mounted elements is substantially aligned with one of the frame-mounted elements creating a closed state wherein electrons tunnel from the at least one of the tuning-fork-mounted elements over a gap to the substantially-aligned, frame-mounted element.

2. The gyroscope of claim 1, further comprising a third driver configured to drive the tuning fork to oscillate with respect to the frame in the second direction.

3. The gyroscope of claim 1, wherein the position triggers are located on distal ends of the first and second prongs.

4. The gyroscope of claim 3, wherein when a given prong is in a zero force position with respect to the frame, at least two of the given prong's electron-tunneling-tip switches are in closed states.

5. The gyroscope of claim 3, wherein the frame-mounted elements of the position triggers are conductive planes configured such that during a triggering event electrons tunnel from one of the tuning-fork-mounted elements to an edge of one of the conductive planes.

6. The gyroscope of claim 5, wherein the edges of the conductive planes are curved such that as the prongs oscillate in the first direction the size of the gap remains substantially the same.

7. The gyroscope of claim 1, wherein the position triggers are located on opposite sides of the distal end of the base.

8. The gyroscope of claim 7, wherein the tuning fork further comprises first and second arms having proximal and distal ends, wherein the proximal ends of the first and second arms are coupled to the distal end of the base, and wherein the position triggers are located on the distal ends of the first and second arms.

9. A method for inertial sensing using a time-domain, tuning-fork gyroscope comprising the following steps:
    driving first and second prongs of a tuning fork of the tuning fork gyroscope to oscillate with respect to a frame of the tuning fork gyroscope in a first direction, such that the prongs oscillate at respective resonant frequencies of the first and second prongs and 180° out of phase with each other;
    monitoring closed and open states of two pairs of second-direction-stacked electron-tunneling-tip switches, wherein a second direction is orthogonal to the first direction, and wherein each pair of switches is operatively coupled to the frame and the tuning fork such that each pair of switches passes through at least two closed states during each oscillation of the tuning fork in the second direction;
    measuring a time interval between closed states of each switch pair to characterize an offset of the tuning fork in the second direction; and
    determining a Coriolis force acting on the tuning fork gyroscope by calculating the offset of the tuning fork in the second direction.

10. The method of claim 9, wherein the two pairs of second-direction-stacked electron-tunneling-tip switches are mounted to a section of the tuning fork where the prongs meet a base of the tuning fork.

11. The method of claim 9, wherein one of the two pairs of second-direction-stacked electron-tunneling-tip switches are mounted to distal ends of each of the prongs.

12. The method of claim 11, further comprising the step of calculating an oscillation amplitude of a given prong in the second direction based on the time interval between successive closed states of the prong's switch pair.

13. The method of claim 12, further comprising the step of driving the prongs to oscillate with respect to the frame in the second direction.

14. The method of claim 12, wherein the Coriolis force is expressed as a change in amplitude of the second-direction oscillation of a given prong when both a second-direction resonant frequency and a first-direction resonant frequency of the given prong match.

15. The method of claim 14, wherein the Coriolis force is expressed as a second-direction offset of the resonant oscillation of the tuning fork in the second direction when the resonant frequency of the tuning fork in the second direction is much greater than that of the prong's resonant frequency in the first direction.

16. A gyroscope comprising:
    a frame;
    a tuning fork comprising a base and first and second prongs, wherein a proximal end of the base is coupled to the frame and wherein proximal ends of the first and second prongs are coupled to a distal end of the base;
    a first driver operatively coupled to the first prong such that the first driver is configured to drive the first prong to oscillate with respect to the frame in a first direction at a first prong's resonant frequency;
a second driver operatively coupled to the second prong such that the second driver is configured to drive the second prong to oscillate with respect to the frame in the first direction at a second prong's resonant frequency and 180° out of phase with the first prong;
a first pair of electron-tunneling tip switches operatively coupled to the frame and a first location on the tuning fork such that the first pair of switches is configured to switch from an open state to a closed state at least twice during a complete oscillation of the tuning fork with respect to the frame in a second direction; and
a second pair of electron-tunneling tip switches operatively coupled to the frame and a second location on the tuning fork such that the second pair of switches is configured to switch from an open state to a closed state at least twice during a complete oscillation of the tuning fork with respect to the frame in the second direction.

17. The gyroscope of claim 16, wherein the first and second locations are on the distal end of the base near where the first and second prongs are respectively coupled to the base.

18. The gyroscope of claim 16, wherein the tuning fork further comprises first and second arms having proximal and distal ends, wherein the proximal ends of the first and second arms are coupled to the distal end of the base such that the first and second arms protrude from the base in the first direction, orthogonal to the first and second prongs, and wherein the first and second locations are on the distal ends of the first and second arms respectively.

19. The gyroscope of claim 16, wherein the first and second prongs each further comprises a distal end, which is separated from an edge of the frame by a gap, and wherein the edge of the frame is curved such that as the prongs oscillate in the first direction the size of the gap remains substantially the same, and wherein the first and second locations are on the distal ends of the first and second prongs respectively.

* * * * *